J. E. LONERGAN.
Lubricators.
No. 5,796. Reissued March 17, 1874
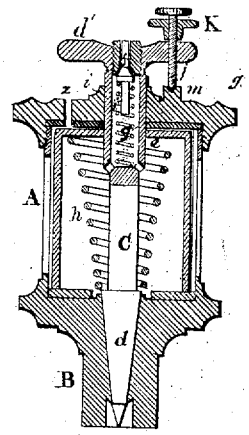
Attest
H. S. Miller
Alonzo Hughes
Inventor
John E. Lonergan
Per A. H. & R. K. Evans
Attorneys

UNITED STATES PATENT OFFICE.

JOHN E. LONERGAN, OF SACRAMENTO, CALIFORNIA.

IMPROVEMENT IN LUBRICATORS.

Specification forming part of Letters Patent No. 132,477, dated October 22, 1872; reissue No. 5,796, dated March 17, 1874; application filed March 2, 1874.

*To all whom it may concern:*

Be it known that I, JOHN E. LONERGAN, of Sacramento, Sacramento county, State of California, have invented an Improved Lubricator; and I do hereby declare the following description and accompanying drawing are sufficient to enable any person skilled in the art or science to which it most nearly appertains to make and use my said invention or improvement without further invention or experiment.

My invention relates to an improved oil-cup or lubricator for journals and other frictional surfaces, and is particularly adapted for use on locomotive-engines.

In order to explain my invention so that others will be able to understand its construction and operation, reference is had to the accompanying drawing forming a part of this specification, in which the figure is a vertical sectional elevation.

A represents a cup, which, in the present instance, is composed of an outer skeleton metal frame and an inner glass vessel, so united together that the oil will be held inside of the glass vessel without leaking. The stem B, which extends downward from the center of the bottom of the cup, has a hole passing through it, the upper end of which, where it opens into the cup, is made conical. A spindle, C, passes down through the center of the upper end of the cup, and has, at its lower end, a conical plug, *d*, which fits into the conical hole in the stem B so as to completely close the hole, where it is allowed to freely rest in it; but by slightly elevating this stem a space will be opened entirely around the plug, through which the oil will flow and drop from the points or apex of the cone, corresponding in quantity to the size of the opening. A hole, Z, in the top serves as a vent. A spiral spring, *h*, is coiled around the spindle so as to bear at its lower end against the enlargement of the upper end of the cone. The upper end, *e*, of the spindle C is somewhat enlarged, and is made to fit closely in the hole in the center of the upper end of the cup through which it passes. A small horizontal thumb-wheel, *d'*, is formed at the top of the spindle C above the cup, by which the spindle can be readily turned for the purpose hereinafter described. A hole, *i*, passes from the upper end of the spindle C down into the enlarged portion *e*, and communicates with the interior of the cup. The upper end of this hole is closed by a valve, *f*, which is pressed upward against a conical seat by a spiral or other spring, *g*, inside of the enlarged portion *e*. This hole serves as a passage for the oil in replenishing the cup, as by depressing the valve *f* the oil can be poured directly into the upper end of the hole, through which it will pass into the cup. The spring *g* keeps the valve tightly closed, and prevents the entrance of dust into the cup. It also prevents the oil from being thrown out of the cup by motion of the engine or piece of machinery upon which it is fixed.

In order to regulate the feed of the cup, I employ a vertical set-screw, *j*, which passes down through the rim of the thumb-wheel *d'*, and which can be fixed at any desired point by a locking thumb-screw, K, or other equivalent device. On the upper end of the cup, in a position to receive the lower end of the screw *j*, I secure a projection, *m*, which has a depression on its upper face. By turning the spindle the set-screw *j* can be brought directly over this projection, when, by turning the screw down so that its lower end will rest in the depression or concavity in the upper face of the projection, the spindle can be raised as desired, so as to lift the conical plug *d* and allow the oil to feed out through the stem B.

When it is desired to cease feeding the oil, it is only necessary to lift the spindle and turn it slightly, so as to let it descend without allowing the screw to rest upon the projection. This allows the plug *d* to completely close the feed-opening, and when it is desired to again feed the oil it will only be necessary to lift the spindle and turn it until the screw rests upon the projection, and thus preserve the exact quantity of feed which was previously had.

Having thus described my invention, what I claim, and desire to secure by Letters Patent, is—

1. The spindle C, having the hole *i* passing down through its upper end and communicating with the interior of the cup, in combination with the valve *f* and spring *g*, substantially as and for the purpose above described.

2. The vertical set-screw *j*, in combination with its locking thumb-screw K and projection *m*, substantially as and for the purpose set forth.

3. The projection *m*, having a depression in its upper face, in combination with the set-screw *j* and the spiral spring *h*, substantially as set forth.

In witness whereof I have hereunto set my hand.

JOHN E. LONERGAN.

Witnesses:
W. S. JEANS,
F. P. WATERHOUSE.